US012234388B2

(12) United States Patent
Park et al.

(10) Patent No.: US 12,234,388 B2
(45) Date of Patent: Feb. 25, 2025

(54) PROTECTIVE FILM

(71) Applicant: LG Chem, Ltd., Seoul (KR)

(72) Inventors: Byung Su Park, Daejeon (KR); Hui Je Lee, Daejeon (KR); Hak Lim Kim, Daejeon (KR); Yoon Kyung Kwon, Daejeon (KR); Dong Kyu Kim, Daejeon (KR); Hoon Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 256 days.

(21) Appl. No.: 16/083,260

(22) PCT Filed: Mar. 13, 2017

(86) PCT No.: PCT/KR2017/002690
§ 371 (c)(1),
(2) Date: Sep. 7, 2018

(87) PCT Pub. No.: WO2017/155368
PCT Pub. Date: Sep. 14, 2017

(65) Prior Publication Data
US 2019/0119537 A1 Apr. 25, 2019

(30) Foreign Application Priority Data
Mar. 11, 2016 (KR) .................. 10-2016-0029514

(51) Int. Cl.
*C09J 183/04* (2006.01)
*C08K 3/017* (2018.01)
*C08K 5/00* (2006.01)
*C09J 7/38* (2018.01)
*C09J 11/04* (2006.01)
*C09J 11/08* (2006.01)
*C09J 133/08* (2006.01)
*C09J 183/12* (2006.01)
B32B 27/28 (2006.01)
C08G 77/46 (2006.01)
C08K 3/16 (2006.01)

(52) U.S. Cl.
CPC ............. *C09J 183/04* (2013.01); *C08K 3/017* (2018.01); *C08K 5/0075* (2013.01); *C09J 7/38* (2018.01); *C09J 11/04* (2013.01); *C09J 11/08* (2013.01); *C09J 133/08* (2013.01); *C09J 183/12* (2013.01); B32B 27/283 (2013.01); B32B 2383/00 (2013.01); B32B 2405/00 (2013.01); C08G 77/46 (2013.01); C08K 3/16 (2013.01); C08K 5/0025 (2013.01); C09J 2203/318 (2013.01); C09J 2301/00 (2020.08); C09J 2301/30 (2020.08); C09J 2301/40 (2020.08); C09J 2301/408 (2020.08); C09J 2433/00 (2013.01); C09J 2467/006 (2013.01); C09J 2483/00 (2013.01); Y10T 428/31663 (2015.04)

(58) Field of Classification Search
CPC ............. C08F 220/1808; C08F 220/20; C08F 220/14; C08G 77/46; C08L 83/12; C08L 83/04; C08K 3/017; C08K 3/16; C08K 5/0025; C08K 5/0075; C09J 11/04; C09J 11/08; C09J 133/08; C09J 183/04; C09J 183/12; C09J 2203/318; C09J 2433/00; C09J 2467/006; C09J 2483/00; C09J 7/38; C09J 11/06; C09J 2301/408; C09J 7/20; G02B 2207/121; G02B 5/3025; G02B 5/3033
See application file for complete search history.

(56) References Cited

U.S. PATENT DOCUMENTS

| | | | |
|---|---|---|---|
| 2006/0159915 A1 | 7/2006 | Chang et al. | |
| 2011/0109849 A1* | 5/2011 | Yoo | C09J 133/14 522/39 |
| 2011/0311810 A1* | 12/2011 | Yamagata | C09J 133/08 428/354 |
| 2013/0123530 A1 | 5/2013 | Boehm et al. | |
| 2013/0260148 A1 | 10/2013 | Kataoka et al. | |
| 2014/0308516 A1* | 10/2014 | Yonezaki | C09J 7/38 428/355 AC |
| 2014/0377551 A1 | 12/2014 | Kataoka et al. | |
| 2015/0024198 A1* | 1/2015 | Yamagata | B32B 27/08 524/265 |
| 2015/0293287 A1 | 10/2015 | Yasui et al. | |
| 2015/0315346 A1 | 11/2015 | Lee et al. | |

FOREIGN PATENT DOCUMENTS

| | | |
|---|---|---|
| CN | 103360974 A | 10/2013 |
| EP | 2402409 A1 | 1/2012 |
| EP | 2692811 A1 | 2/2014 |
| JP | 4342775 B2 | 10/2009 |
| JP | 2009275128 A | 11/2009 |
| JP | 2011236266 A | 11/2011 |
| JP | 2011236267 A | 11/2011 |
| JP | 2013163744 A | 8/2013 |

(Continued)

OTHER PUBLICATIONS

NOF catalogue retrieved Mar. 9, 2022.*

(Continued)

*Primary Examiner* — Michael B Nelson

(74) *Attorney, Agent, or Firm* — Lerner David LLP

(57) ABSTRACT

The present invention relates to a protective film and a polarizing plate comprising the same, and provides a protective film capable of minimizing the amount of static electricity that can be generated upon peeling the protective film.

12 Claims, No Drawings

(56) References Cited

FOREIGN PATENT DOCUMENTS

| | | | |
|---|---|---|---|
| JP | 2013185008 A | | 9/2013 |
| JP | 2014048497 A | | 3/2014 |
| JP | 2014111705 A | | 6/2014 |
| JP | 2015028134 A | | 2/2015 |
| JP | 2015-127368 | * | 7/2015 |
| JP | 2015131414 A | | 7/2015 |
| KR | 20080068442 A | | 7/2008 |
| KR | 20150010576 A | | 1/2015 |
| KR | 20150059127 A | | 5/2015 |
| KR | 20150083773 A | | 7/2015 |
| TW | 200626691 A | | 8/2006 |
| TW | 201350341 A | | 12/2013 |

OTHER PUBLICATIONS

CAS 26915-72-0 NPL document retrieved Mar. 9, 2022.*
Machine translation of JP 2015-127368, retrieved Jan. 9, 2022.*
Search report from International Application No. PCT/KR2017/002690, mailed Jun. 15, 2017.
Search report from Office Action Dated Nov. 7, 2017 from Tawianese Application No. 106108218.
Search report from Office Action dated Apr. 4, 2018 from Tawainese Application No. 106108218.
Extended European Search Report including Written Opinion for Application No. EP17763628.9 dated Feb. 25, 2019.
Chinese Search Report for Application No. 201780016703.5, dated Jun. 2, 2020, pp. 1-3.
Arndt, K. et al: "4 Molmasse und Molmassenbestimmung", Polymercharakterisierung, Jan. 1, 1996 (Jan. 1, 1996), pp. 92-107, XP002583664, ISBN: 3-446-17588-1 [English Translation of Abstract only].
Wenzel, U. "Charakterisierung eines ultrahochmolekularen Polymethacrylats mit flüssigkristalliner Seitengruppe in verdünnter Lösung", Vorgelegte Dissertation, vol. D83/2000, Jul. 5, 2000 (Jul. 5, 2000), 78 pages, XP007912815. [English Translation of Abstract only].
Bivens, A. "Polymer-to-Solvent Reference Table for GPC/SEC," Technical Overview, Mar. 24, 2016, pp. 1-10, XP093014671, Retrieved from the Internet: URL:https://www.agilent.com/cs/library/technicaloverviews/public/5991-6802EN.pdf.

* cited by examiner

PROTECTIVE FILM

CROSS-REFERENCE TO RELATED APPLICATIONS

The present application is a national phase entry under 35 U.S.C. § 371 of International Application No. PCT/KR2017/002690 filed Mar. 13, 2017, which claims priority from Korean Patent Application No. 10-2016-0029514 filed on Mar. 11, 2016, the disclosures of which are incorporated herein by reference in its entirety.

TECHNICAL FIELD

Technical Field

The present application relates to a protective film and a polarizing plate comprising the same.

Background Art

In the case of a polarizing plate, a protective film for protecting the polarizing plate from external impact, friction and contamination is required from processes for manufacturing the polarizing plate to processes for making an LCD module. Such a protective film needs, together with tackiness to be initially fixed to an adherend, a low peel force capable of being peeled off without damaging the adherend after the process.

The base film used in the conventional polarizing plate has a high surface energy, and thus when an antistatic agent such as a metal salt or an organic salt was included in the pressure-sensitive adhesive of the protective film, the antistatic agent was easily transferred onto the surface of the pressure-sensitive adhesive and the surface resistance of the surface of the polarizing plate as the adherend after peeling could be lowered, thereby generating a small amount of static electricity. However, in recent years, in order to realize physical properties such as low reflection and anti-glare on the polarizing plate surface, as the coating layer was formed on the outermost layer of the polarizing plate, the surface energy of the surface of the polarizing plate was lowered due to additives of Si or F series. When the surface energy of the polarizing plate as the adherend is lowered as such, the antistatic agent is not easily transferred, whereby the surface resistance of the peeling interface is increased upon peeling the protective film and the amount of the generated static electricity is also increased.

Patent Document 1, which is a prior patent, discloses a protective film for preventing damage such as contamination and scratches of a conductive thin film.

PRIOR ART DOCUMENT

Patent Document (Patent Document 1) Japanese Patent No. 4342775

DISCLOSURE

Technical Problem

The present invention relates to a protective film and a polarizing plate comprising the same, and provides a protective film capable of minimizing the amount of static electricity that can be generated upon peeling the protective film.

Technical Solution

The present application relates to a protective film. The protective film can be applied to a polarizing plate and can protect the polarizing plate from external impact, friction and contamination, from processes for manufacturing the polarizing plate to processes for making an LCD module.

An exemplary protective film may comprise a pressure sensitive adhesive layer comprising a polyorganosiloxane satisfying Formula 1 below and a metal salt.

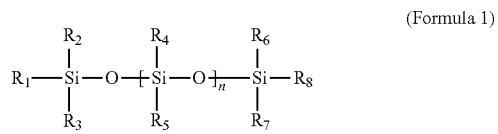

(Formula 1)

In Formula 1 above, n is any number in a range of 0 to 1500. In one example, n may be from 5 to 1300, from 10 to 1000, from 15 to 800, from 20 to 500, from 25 to 400, from 30 to 300, from 35 to 200, or from 40 to 180. In addition, $R_1$ to $R_8$ are the same or different from each other and each independently hydrogen, an alkyl group, an alkoxy group, an alkenyl group, an alkynyl group or an alkylene oxide, and at least one of $R_1$ to $R_8$ may be an alkylene oxide. Here, at least one of $R_1$ to $R_8$ may be an alkyl group having 1 to 30 carbon atoms, and specifically, a methyl group, an ethyl group or a propyl group. For example, the alkyl group may be a methyl group and the polyorganosiloxane may be polydimethylsiloxane, without being limited thereto. Furthermore, the alkylene oxide may be an alkylene oxide having 2 to 10 carbon atoms, and may, for example, be ethylene oxide, without being limited thereto. In one example, the alkylene oxide may be either $R_4$ or $R_5$.

In addition, the pressure-sensitive adhesive layer may comprise a metal salt together with the polyorganosiloxane. The metal salt may form a chelate together with the polyorganosiloxane. In one example, the metal salt may be an antistatic agent. In one example, the metal salt may comprise an alkali metal or an alkaline earth metal. An example of the metal salt may include a metal salt consisting of lithium, sodium, potassium or magnesium, and specifically, a metal salt composed of a cation consisting of $Li^+$, $Na^+$, $K^+$ or $Mg^+$ and an anion consisting of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$ or $(CF_3SO_2)_3C^-$ can be used. In the present application, in particular, a metal salt such as LiBr, LiI, LiBF$_4$, LiPF$_6$, LiSCN, LiClO$_4$, LiCF$_3$SO$_3$, Li(CF$_3$SO$_2$)$_2$N, Li(C$_2$F$_5$SO$_2$)$_2$N, Li(CF$_3$SO$_2$)$_3$C, K(CF$_3$SO$_2$)$_2$N, or Mg((CF$_3$SO$_2$)$_2$N)$_2$ can be used. These alkali metal salts may be used alone or in a mixture of two or more. The metal salt may be included in an amount of 50 to 150 parts by weight, 60 to 140 parts by weight, 70 to 130 parts by weight or 80 to 120 parts by weight, relative to 100 parts by weight of the polyorganosiloxane, but is not limited thereto.

The metal salt included in the protective film according to the present application can minimize the static electricity by serving to lower the surface resistance of the peeling interface. However, for the polarizing plate having a low surface energy, the polydimethylsiloxane conventionally used as an antistatic agent had a problem that the transfer is not achieved by accompanying the metal salt. That is, when the surface energy of the polarizing plate is low, the polydimethylsiloxane is easily transferred onto the hydrophobic surface, while the metal salt is not transferred well, and consequently, the surface resistance is increased and the amount of the generated static electricity is also increased.

However, the polyorganosiloxane of Formula 1 according to the present invention can be easily transferred onto the peeling interface together with the metal salt by forming a chelate with the metal salt, and thus lower the surface resistance of the adherend to minimize the amount of the generated static electricity. The polyorganosiloxane may have at least one alkylene oxide, where the alkylene oxide and the metal salt, which are hydrophilic, form a chelate, and thus the polyorganosiloxane and the metal salt can be easily transferred together onto the peeling interface. In the present specification, the term peeling interface may mean a surface of a pressure-sensitive adhesive layer and a surface of a polarizer to which a protective film is applied.

The term alkyl group herein may mean, unless otherwise specified, a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

The term alkoxy group herein may mean an alkoxy group having 1 to 8 carbon atoms or 1 to 4 carbon atoms, unless otherwise specified. The alkoxy group may be linear, branched or cyclic. In addition, the alkoxy group may be optionally substituted with one or more substituents.

In addition, the alkenyl group herein may mean, unless otherwise specified, an alkenyl group having 2 to 20 carbon atoms, 2 to 16 carbon atoms, 2 to 12 carbon atoms, 2 to 8 carbon atoms, or 2 to 4 carbon atoms. The alkenyl group may be linear, branched or cyclic. Also, the alkenyl group may be optionally substituted with one or more substituents.

Furthermore, the alkynyl group herein may mean, unless otherwise specified, an alkynyl group having 2 to 20 carbon atoms, 2 to 16 carbon atoms, 2 to 12 carbon atoms, 2 to 8 carbon atoms, or 2 to 4 carbon atoms.

In an embodiment of the present application, the weight average molecular weight of the polyorganosiloxane is not particularly limited, but may be, preferably, 300 to 100,000. In one example, the molecular weight may be, for example, 400 to 90,000, 400 to 80,000, 500 to 70,000, 1,000 to 60,000, 5,000 to 50,000, or 10,000 to 30,000. In the present application, the term weight average molecular weight means a conversion value for standard polystyrene measured by GPC (Gel Permeation Chromatograph).

In one example, the pressure-sensitive adhesive layer of the present application may comprise a pressure-sensitive adhesive base resin. The pressure-sensitive adhesive base resin may comprise a (meth) acrylic acid ester monomer as a polymerized unit. The pressure-sensitive adhesive layer of the present application comprises 80 to 99.8 parts by weight, 82 to 99.5 parts by weight, 84 to 99 parts by weight, 86 to 97 parts by weight or 87 to 95 parts by weight of the pressure-sensitive adhesive base resin and 0.01 to 10 parts by weight, 0.01 to 8 parts by weight, 0.05 to 7 parts by weight, 0.08 to 6 parts by weight, 0.1 to 5 parts by weight, 0.1 to 3 parts by weight, 0.1 to 1.5 parts by weight, 0.2 to 1 part by weight, 0.3 to 0.9 part by weight or 0.3 to 0.8 parts by weight of the polyorganosiloxane. Alternatively, the pressure-sensitive adhesive layer of the present application may comprise 0.01 to 10 parts by weight or 0.01 to 0.9 parts by weight of the polyorganosiloxane, relative to 100 parts by weight of the pressure-sensitive adhesive base resin. In the present application, the unit "part by weight" means a weight ratio between the respective components. By adjusting the weight ratio of the resin and the polyorganosiloxane as described above, physical properties such as initial adhesion, durability and peel force of the pressure-sensitive adhesive layer can be effectively maintained.

In one example, the (meth) acrylic acid ester monomer may be an alkyl (meth) acrylate. For example, the (meth) acrylic acid ester monomer may be at least one selected from the group consisting of methyl (meth) acrylate, ethyl (meth) acrylate, n-propyl (meth) acrylate, isopropyl (meth) acrylate, n-butyl (meth) acrylate, t-butyl (meth) acrylate, sec-butyl (meth) acrylate, pentyl (meth) acrylate, 2-ethylhexyl (meth) acrylate, 2-ethylbutyl (meth) acrylate, n-octyl (meth) acrylate, isooctyl (meth) acrylate, isononyl (meth) acrylate, lauryl (meth) acrylate and tetradecyl (meth) acrylate, but is not limited thereto.

Furthermore, the pressure-sensitive adhesive base resin of the present application may further comprise a polymerized unit derived from a copolymerizable monomer having a cross-linkable functional group. In one example, the copolymerizable monomer having a cross-linkable functional group may be at least one selected from the group consisting of a hydroxy group-containing comonomer, a carboxyl group-containing comonomer and a nitrogen-containing comonomer. For example, the hydroxy group-containing comonomer may be 2-hydroxyethyl (meth) acrylate. Here, the copolymerizable monomer having a cross-linkable functional group may be included in an amount of 0.01 to 14 parts by weight, 0.5 to 14 parts by weight, 1 to 13 parts by weight, 1.5 to 12 parts by weight, 1.5 to 11 parts by weight, 1.8 to 9 parts by weight, or 1.9 to 8 parts by weight, relative to 100 parts by weight of the pressure-sensitive adhesive base resin. By controlling the copolymerizable monomer having a cross-linkable functional group in the above range, the storage stability of the base resin can be secured. Specifically, in order to realize a low peel force as a protective film, there is a method of increasing cross-linking, for which a large amount of the cross-linkable functional group-containing monomer can be used. However, in order to realize a low peel force, when the copolymerizable monomer having a cross-linkable functional group is included in an amount of more than 14 parts by weight, the storage stability and polymerization stability of the base resin may be deteriorated.

In an embodiment of the present application, the pressure-sensitive adhesive layer may further comprise a multifunctional cross-linking agent for cross-linking the pressure-sensitive adhesive base resin. As the multifunctional cross-linking agent, an isocyanate compound, an epoxy compound, an aziridine compound and a metal chelate compound, and the like can be used, and one or two or more of the cross-linking agents can be appropriately selected in consideration of the kind of the cross-linkable functional group contained in the resin. The isocyanate compound is tolylene diisocyanate, xylene diisocyanate, diphenylmethane diisocyanate, hexamethylene diisocyanate, isophorone diisocyanate, tetramethylxylene diisocyanate or naphthalene diisocyanate, but an addition reaction product of at least one of the above isocyanate compounds and a polyol, and the like can be used, where as the polyol, trimethylolpropane or the like can be used. In addition, as the epoxy compound, one or two or more of ethyleneglycol diglycidyl ether, triglycidyl ether, trimethylolpropane triglycidyl ether, N,N,N',N'-tetraglycidylethylenediamine or glycerin diglycidyl ether and the like can be used, and as the aziridine compound, one or two or more of N,N'-toluene-2,4-bis (1-aziridine carboxamide), N,N'-diphenylmethane-4,4'-bis(1-aziridine carboxamide), triethylene melamine, bisisoprothaloyl-1-(2-methyl aziridine), or tri-1-aziridinylphosphine oxide, and the like can be used. Furthermore, as the metal chelate compound, a compound in which a polyvalent metal exists in a state of coordinately bonded to acetyl acetone, ethyl acetate or the like can be used, where the kind of the polyvalent metal is aluminum, iron, zinc, tin, titanium, antimony, magnesium or vanadium, and the like.

In one example, the multifunctional cross-linking agent may be a mixture of an aliphatic linear polyvalent NCO and an aliphatic cyclic polyvalent NCO. For example, the aliphatic linear polyvalent NCO may include hexamethylene diisocyanate, and the aliphatic cyclic polyvalent NCO may include isophorone diisocyanate. The aliphatic linear polyvalent NCO and the aliphatic cyclic polyvalent NCO may be mixed in a weight ratio of 6:4 to 9:1 to form a mixture, and the mixture may comprise 8 to 20% by weight of NCO. Meanwhile, the NCO herein may mean an isocyanate group.

The multifunctional cross-linking agent may be included in the pressure-sensitive adhesive layer in an amount of 0.01 to 20 parts by weight, 0.1 to 18 parts by weight, 0.5 to 15 parts by weight, 1.5 to 10 parts by weight, 2 to 8 parts by weight, 2.5 to 5.5 parts by weight or 2.5 to 5.3 parts by weight, relative to 100 parts by weight of the pressure-sensitive adhesive base resin. In order to realize a low peel force of the protective film, there is a method of increasing the cross-linking as described above, for which an excessive amount of the cross-linking agent must be used. However, when the cross-linking agent is used in an excess amount, there may be a problem that a pot life of a coating liquid of the pressure-sensitive adhesive layer increases. The pressure-sensitive adhesive layer according to the present invention can improve the pot life of the pressure-sensitive adhesive layer by limiting the content of the multifunctional cross-linking agent to 20 parts by weight or less, 14 parts by weight or less, or 10 parts by weight or less.

In addition, the pressure-sensitive adhesive layer of the present application may further comprise a curing retardant. The curing retardant may comprise at least one of β-ketoesters such as methyl acetoacetate, ethyl acetoacetate, octyl acetoacetate, oleyl acetoacetate, lauryl acetoacetate or stearyl acetoacetate, or β-diketones such as acetylacetone, 2,4-hexanedione or benzoyl acetone. The curing retardant may be included in an amount of 0.1 to 20 parts by weight or 1 to 10 parts by weight relative to 100 parts by weight of the pressure-sensitive adhesive base resin.

The pressure-sensitive adhesive layer of the present application may further comprise, in addition to the above-mentioned components, one or two or more of additives such as a silane coupling agent; a tackifier; an epoxy resin; an ultraviolet stabilizer; an antioxidant; a toning agent; a reinforcing agent; a filler; a defoamer; a surfactant; a catalyst; or a plasticizer.

In one example, the protective film may further comprise a base material layer, and the pressure sensitive adhesive layer may be formed on one side of the base material layer. The base material layer may comprise a single component polymer such as a polyester-based polymer, a polyolefin-based polymer, a norbornene-based polymer, polycarbonate, polyether sulfone or polyarylate, a copolymerized polymer, or an epoxy-based polymer. The thickness of the base material layer is not particularly limited, but is generally about 20 to 300 μm, preferably 30 to 200 μm.

In an embodiment of the present application, the protective film can be applied to an adherend having a surface energy of 15 mN/m to 40 mN/m. Specifically, the pressure sensitive adhesive layer of the protective film can be applied to an adherend having low surface energy, and the present application can provide the protective film having high reliability by minimizing the amount of static electricity even when applied to the specific adherend. The surface energy ($\gamma^{surface}$, mN/m) can be calculated as $\gamma^{surface} = \gamma^{dispersion} + \gamma^{polar}$. The surface energy may be a value measured by a known measuring method. In one example, the surface energy can be measured using a Drop Shape Analyzer (DSA100 product from KRUSS). For example, the surface energy is determined for a target to be measured by repeating a process of dropping deionized water, whose surface tension is known, and obtaining the contact angle thereof five times to obtain the average value of the resulting five contact angle values, and equally by repeating a process of dropping diiodomethane, whose surface tension is known, and obtaining the contact angle thereof five times to obtain the average value of the resulting five contact angle values. Then, the value (Strom value) related to the surface tension of the solvent can be substituted using the obtained average values of the contact angles for deionized water and diiodomethane by the Owens-Wendt-Rabel-Kaelble method to obtain the surface energy.

The present application also relates to a polarizing plate. Exemplary polarizing plates may comprise the above-mentioned protective film. In one example, the polarizing plate may comprise at least one polarizer and the protective film formed on one surface of the polarizer. Furthermore, in an embodiment of the present application, the polarizing plate may further comprise a coating layer formed on one surface of the polarizer and having a surface energy of 15 mN/m to 40 mN/m, 20 mN/m to 35 mN/m or 25 mN/m to 30 mN/m, where the protective film may be formed on the coating layer. The coating layer may be an additional functional layer, and the kind thereof is not limited. In one example, the coating layer may be a low reflective layer or an anti-glare layer. The polarizing plate having the protective film can be applied to all of usual liquid crystal display devices, and the kind of the liquid crystal panel is not particularly limited. For example, a liquid crystal display device comprising a liquid crystal panel in which the protective film is bonded to one surface or both surfaces of a liquid crystal cell can be configured.

Effects of the Invention

The protective film according to the present application can minimize the amount of static electricity that can be generated upon peeling the protective film from the adherend.

DETAILED DESCRIPTION OF THE INVENTION

Hereinafter, the present application will be described in more detail by way of examples according to the present application and comparative examples not complying with the present application, but the scope of the present application is not limited by the following examples.

EXAMPLE 1

<Preparation of Pressure-Sensitive Adhesive Layer>

2-Ethylhexyl acrylate (2-EHA) and 2-hydroxyethyl acrylate (2-HEA) were copolymerized in ethyl acetate at a weight ratio of 98:2 (2-EHA:2-HEA) to obtain a solution of an acrylic copolymer.

Then, 5 parts by weight of HMDI/IPDI (hexamethylene diisocyanate/isophorone diisocyanate) (=8/2 weight ratio (NCO %: 16 wt %)) as an isocyanate cross-linking agent, 7 parts by weight of acetyl acetone as a curing retardant, 0.5 part by weight of polydimethylsiloxane (weight average molecular weight: 20,000) having ethylene oxide bonded at the $R_5$ position as a polyorganosiloxane of Formula 1 and 0.5 part by weight of $Li(CF_3SO_2)_2N$ as a metal salt, relative to 100 parts by weight (solid content) of the acrylic copolymer, were mixed to obtain a pressure-sensitive adhesive composition.

<Preparation of Protective Film>

The pressure-sensitive adhesive composition was coated on one side of A4300 PET (Toyobo Co., Ltd.) (thickness: 100 μm), and a transparent pressure-sensitive adhesive layer having a thickness of 15 μm was formed after drying Immediately after drying, the release film is covered and aged at 40° C. for 4 days.

EXAMPLE 2

A protective film was prepared in the same manner as in Example 1, except that $K(CF_3SO_2)_2N$ was used as the metal salt.

EXAMPLE 3

A protective film was prepared in the same manner as in Example 1, except that $Mg((CF_3SO_2)_2N)_2$ was used as the metal salt.

EXAMPLE 4

A protective film was prepared in the same manner as in Example 1, except that 1 part by weight of the polyorganosiloxane of Formula 1 was introduced.

COMPARATIVE EXAMPLE 1

A protective film was prepared in the same manner as in Example 1, except that the polyorganosiloxane of Formula 1 was not added.

COMPARATIVE EXAMPLE 2

A protective film was prepared in the same manner as in Example 1, except that polydimethylsiloxane was used instead of the polyorganosiloxane of Formula 1.

COMPARATIVE EXAMPLE 3

A protective film was prepared in the same manner as in Example 1, except that an ammonium salt $((n-C_4H_9)_3(CH_3)N^+ {}^-N(SO_2CF_3)_2)$ was used as an antistatic agent instead of the metal salt.

EXPERIMENTAL EXAMPLE 1

ESD (Electrostatic Discharge, kV) Measurement

A pressure-sensitive adhesive layer of a protective film prepared in Examples and Comparative Examples was laminated to an anti-glare layer of an anti-glare polarizing plate (TAC (tri-acetyl-cellulose film) film layer/PVA (polyvinyl alchol) layer/TAC film layer) having a surface energy in the range of 15 mN/m to 40 mN/m, and then a sample was prepared by tailoring the polarizing plate into A4 size and fixing the opposite side of the polarizing plate laminated with the protective film to the bottom surface through a double-faced tape. The measurement was performed using a STATIRON DZ-4 model from SHISHIDO Co. as an electrostatic instrument, where the measurement distance from the sample was fixed at 3 cm. While peeling the protective film at the peeling speed of 30 m/min and the peeling angle of 180°, the static electricity to be generated was measured. In the measurement, it may be determined for the case of 0.5 kV or more to be poor and for the case of less than 0.5 kV to be good.

EXPERIMENTAL EXAMPLE 2

Staining Properties

A protective film prepared in Examples and Comparative Examples was laminated to an anti-glare polarizing plate in the same manner as in Experimental Example 1, and then left at 50° C. for at least one day, and a black tape was laminated to the opposite side of the polarizing plate laminated with the protective film to ensure the visibility of the staining property evaluation. Then, by repeatedly peeling the protective film from the polarizing plate and attaching it thereto, bubbles were artificially entrained and then allowed to stand at room temperature for at least one day. The protective film containing the bubbles was subjected to heat treatment at 50° C. for 3 hours, and then visually observed for staining. They were classified by representing O if bubble marks were not observed with the naked eye and X if bubble marks were observed with the naked eye.

TABLE 1

|  | ESD(kV) | Staining |
| --- | --- | --- |
| Example 1 | 0.15 | O |
| Example 2 | 0.20 | O |
| Example 3 | 0.22 | O |
| Example 4 | 0.10 | X |
| Comparative Example 1 | 0.87 | O |
| Comparative Example 2 | 0.72 | O |
| Comparative Example 3 | 0.54 | O |

In Comparative Example 1, no polyorganosiloxane was added and in Comparative Example 2, polydimethylsiloxane was added, without any alkylene oxide functional group, and thus as a result of measuring static electricity in Comparative Examples 1 and 2, the static electricity was generated three times or more as compared with Examples. Also, as a result of measuring static electricity in the case of Comparative Example 3 in which the organic salt was included instead of the metal salt, the static electricity was generated twice or more as compared with Examples.

The invention claimed is:

1. A protective film having a pressure-sensitive adhesive layer, wherein the pressure-sensitive adhesive layer comprises a pressure-sensitive adhesive base resin, a multifunctional cross-linking agent, a curing retardant, a polyorganosiloxane satisfying Formula 1 below and a metal salt:

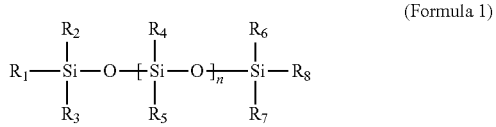

(Formula 1)

wherein, n is any one number in a range of 0 to 1500, $R_1$ to $R_8$ are the same or different from each other and each independently hydrogen, an alkyl group, an alkoxy group, an alkynyl group or an alkylene oxide, at least one of $R_1$, $R_2$, $R_3$, $R_6$, $R_7$, or $R_8$ is hydrogen, or an alkynyl group, and at least one of $R_1$ to $R_8$ is an alkylene oxide, wherein the polyorganosiloxane has a weight average molecular weight of 10,000 to 100,000, wherein the pressure-sensitive adhesive base resin comprises a (meth) acrylic acid ester monomer as a polymerized unit, wherein the pressure-sensitive adhesive layer contains the polyorganosiloxane in an amount of 0.01 to 0.9 parts by weight relative to 100 parts by weight of the pressure-sensitive adhesive base resin, wherein the multifunctional cross-linking agent comprises a mixture of an aliphatic linear polyvalent NCO and an aliphatic cyclic polyvalent NCO in a weight ratio of 6:4 to 9:1, and the mixture comprises 8 to 20% by weight of NCO, wherein the curing retardant is β-diketone, wherein the metal salt forms a chelate with the polyorganosiloxane, and wherein the metal salt comprises an alkaline earth metal.

2. The protective film according to claim 1, wherein the metal salt comprises $Mg((CF_3SO_2)_2N)_2$.

3. The protective film according to claim 1, wherein the metal salt is comprised in an amount of 50 to 150 parts by weight, relative to 100 parts by weight of the polyorganosiloxane.

4. The protective film according to claim 1, wherein the pressure-sensitive adhesive base resin further comprises a polymerized unit derived from a copolymerizable monomer having a cross-linkable functional group.

5. The protective film according to claim 4, wherein the copolymerizable monomer having a cross-linkable functional group is at least one selected from the group consisting of a hydroxy group-containing comonomer, a carboxyl group-containing comonomer and a nitrogen-containing comonomer.

6. The protective film according to claim 4, wherein the copolymerizable monomer having a cross-linkable functional group is comprised in an amount of 0.01 to 14 parts by weight, relative to 100 parts by weight of the pressure-sensitive adhesive base resin.

7. The protective film according to claim 1, wherein the multifunctional cross-linking agent is comprised in the pressure-sensitive adhesive layer in an amount of 0.01 to 20 parts by weight, relative to 100 parts by weight of the pressure-sensitive adhesive base resin.

8. The protective film according to claim 1, wherein the curing retardant is at least one selected from acetylacetone, 2,4-hexanedione or benzoyl acetone.

9. The protective film according to claim 1, further comprising a base material layer, wherein the pressure-sensitive adhesive layer is formed on one surface of said base material layer.

10. The protective film according to claim 1, which is applied to an adherend having a surface energy of 15 mN/m to 40 mN/m.

11. A polarizing plate comprising a polarizer and the protective film according to claim 1 formed on one surface of said polarizer.

12. The polarizing plate according to claim 11, further comprising a coating layer formed on one surface of said polarizer and having a surface energy of 15 mN/m to 40 mN/m, wherein the protective film is formed on said coating layer.

* * * * *